(12) United States Patent
Kim et al.

(10) Patent No.: US 10,175,416 B2
(45) Date of Patent: Jan. 8, 2019

(54) METHOD OF MANUFACTURING A LIGHT GUIDE PLATE AND DISPLAY APPARATUS INCLUDING THE SAME

(71) Applicant: Samsung Display Co., Ltd., Yongin, Gyeonggi-Do (KR)

(72) Inventors: Rae-Young Kim, Seoul (KR);
Taek-Sun Shin, Hwaseong-si (KR);
Sunhee Oh, Anyang-si (KR)

(73) Assignee: Samsung Display Co., Ltd. (KR)

( * ) Notice: Subject to any disclaimer, the term of this patent is extended or adjusted under 35 U.S.C. 154(b) by 463 days.

(21) Appl. No.: 14/788,339

(22) Filed: Jun. 30, 2015

(65) Prior Publication Data

US 2016/0077268 A1 Mar. 17, 2016

(30) Foreign Application Priority Data

Sep. 12, 2014 (KR) .......................... 10-2014-0121130

(51) Int. Cl.
*F21V 8/00* (2006.01)

(52) U.S. Cl.
CPC ......... *G02B 6/0065* (2013.01); *G02B 6/0018* (2013.01); *G02B 6/0028* (2013.01)

(58) Field of Classification Search
CPC .. G02B 6/0018; G02B 6/0028; G02B 6/0065; G02B 6/0033; G02B 6/0013
See application file for complete search history.

(56) References Cited

U.S. PATENT DOCUMENTS

| | | | | |
|---|---|---|---|---|
| 7,102,705 B2* | 9/2006 | Kim | ..................... | G02B 6/0018 349/65 |
| 8,049,839 B2* | 11/2011 | Han | ..................... | G02B 6/0036 349/65 |
| 8,662,727 B2* | 3/2014 | Kanade | ............... | G02B 6/0028 349/65 |
| 9,052,431 B2* | 6/2015 | Que | ..................... | G02B 6/009 |
| 9,322,979 B2* | 4/2016 | Kang | ..................... | G02B 6/005 |
| 9,453,956 B2* | 9/2016 | Wu | ........................ | G02B 6/002 |
| 9,535,204 B2* | 1/2017 | Kunimochi | .......... | G02B 6/0046 |

FOREIGN PATENT DOCUMENTS

| | | |
|---|---|---|
| KR | 20-1996-0038311 U | 12/1996 |
| KR | 10-2000-0051213 A | 8/2000 |
| KR | 10-2007-0081973 A | 8/2007 |
| KR | 10-2008-0045471 A | 5/2008 |
| KR | 10-2011-0040938 A | 4/2011 |
| KR | 10-2011-0078499 A | 7/2011 |
| KR | 10-2012-0122654 A | 11/2012 |

* cited by examiner

*Primary Examiner* — Anh Mai
*Assistant Examiner* — Arman B Fallahkhair
(74) *Attorney, Agent, or Firm* — Innovation Counsel LLP

(57) ABSTRACT

A display apparatus includes a display panel, a light source, a light guide plate, and a receiving part. The display panel is configured to receive light to display an image. The light source is configured to emit the light. The light guide plate is configured to receive and guide the light to the display panel. The receiving part is configured to hold the light source and the light guide plate. The light guide plate includes a first light guide part and a second light guide part. The first light guide part includes a first material. The second light guide part includes a second material different from the first material. The second light guide part has a tapered shape and is coupled to the first light guide part.

15 Claims, 12 Drawing Sheets

METHOD OF MANUFACTURING A LIGHT GUIDE PLATE AND DISPLAY APPARATUS INCLUDING THE SAME

CROSS-REFERENCE TO RELATED APPLICATION

This application claims priority under 35 U.S.C. § 119 to Korean Patent Application No. 10-2014-0121130 filed Sep. 12, 2014, the contents of which are herein incorporated by reference.

BACKGROUND

1. Technical Field

The present disclosure generally relates to a light guide plate and a display apparatus including the same. More particularly, the present disclosure relates to a method of manufacturing a light guide plate, and a display apparatus including the light guide plate, whereby the display apparatus has improved display quality and light utilization efficiency.

2. Description of the Related Art

Non-self-emissive display devices, such as liquid crystal displays, electrophoretic display devices, electrowetting display devices, etc., require a backlight unit to emit light. The backlight unit may be classified as an edge-illumination type backlight unit or a direct-illumination type backlight unit, depending on a position of a light emitting diode relative to a display surface on which an image is displayed.

The edge-illumination type backlight unit has a relatively thinner form factor than the direct-illumination type backlight unit. As a result, the edge-illumination type backlight unit is widely used in portable display devices.

SUMMARY

The present disclosure discloses a display apparatus having improved manufacturing yield and display quality, and a method of manufacturing a light guide plate.

According to an embodiment of the inventive concept, a display apparatus is provided. The display apparatus includes: a display panel configured to receive light to display an image; a light source configured to emit the light; a light guide plate configured to receive and guide the light to the display panel; and a receiving part configured to hold the light source and the light guide plate. The light guide plate includes: a first light guide part comprising a first material; and a second light guide part comprising a second material different from the first material, wherein the second light guide part has a tapered shape and is coupled to the first light guide part.

In some embodiments, the first light guide part may have a plate shape and may further include: a first side surface; a second side surface facing the first side surface; and an upper surface connecting the first side surface and the second side surface, and a thickness of the second light guide part may decrease to form the tapered shape as a distance of the second light guide part from the second side surface decreases.

In some embodiments, the second light guide part may be coupled to the first side surface, wherein the light may be incident to an incident surface of the light guide plate, and wherein the incident surface of the light guide plate may correspond to a surface of the second light guide part.

In some embodiments, the second light guide part may be coupled to the upper surface, wherein the light may be incident to an incident surface of the light guide plate, and wherein the incident surface of the light guide plate may correspond to the first side surface and a surface of the second light guide part.

In some embodiments, the receiving part may include: a bottom portion on which the light guide plate is placed; and a sidewall extending from the bottom portion.

In some embodiments, a refractive index of the second material may be greater than a refractive index of the first material.

In some embodiments, the receiving part may further include a cover portion extending from the sidewall substantially parallel to the bottom portion so as to cover the light source.

In some embodiments, a hardness of the second material may be greater than a hardness of the first material.

In some embodiments, the first material may include a polyamide-based resin, and the second material may include a polymethyl methacrylate-based resin or a methyl methacrylate-styrene-based resin.

According to another embodiment of the inventive concept, a method of manufacturing a light guide plate is provided. The method includes: forming a first light guide part; forming a second light guide part having a tapered shape to the first light guide part; wherein the first light guide part and the second light guide part are formed by separate processes.

In some embodiments, the first light guide part may include a first material, and the second light guide part may include a second material different from the first material.

In some embodiments, the first light guide part may have a plate shape and may further include a first side surface and a second side surface facing the first side surface, and an upper surface connecting the first side surface and the second side surface, wherein a thickness of the second light guide part may decrease to form the tapered shape as a distance of the second light guide part from the second side surface decreases.

In some embodiments, forming the second light guide part may include: placing a mold on a surface of the first light guide part, wherein the mold may include an inlet gate and a frame; injecting a resin through the inlet gate so as to fill the resin in the frame; curing the resin; and separating the frame from the first light guide part.

In some embodiments, the second light guide part may be coupled to the first side surface.

In some embodiments, the second light guide part may be coupled to the upper surface.

In some embodiments, the second light guide part may be formed using an imprinting process.

In some embodiments, the second light guide part may be formed using an inkjet process.

In some embodiments, the second light guide part may be formed using a gravure printing process.

BRIEF DESCRIPTION OF THE DRAWINGS

The above and other advantages of the inventive concept will be more readily apparent by referencing the following detailed description and accompanying drawings.

DETAILED DESCRIPTION

Figure 1:
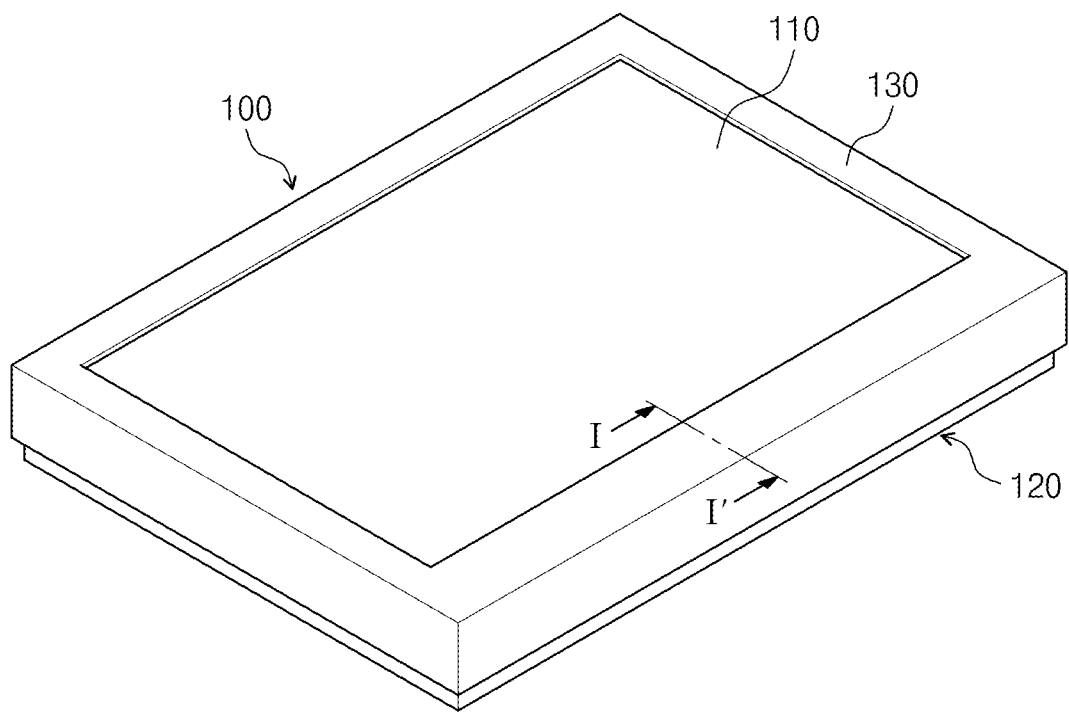
FIG. 1 is a perspective view of a display apparatus according to an embodiment.

The inventive concept will be more fully described herein with reference to the accompanying drawings, in which exemplary embodiments are shown. As those skilled in the art would realize, the embodiments may be modified in various ways without departing from the spirit or scope of the inventive concept.

It will be understood that when an element or layer is referred to as being "on", "connected to" or "coupled to" another element or layer, it can be directly on, connected or coupled to the other element or layer, or with one or more intervening elements or layers being present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by those terms. Rather, those terms are merely used to distinguish one element, component, region, layer or section from another region, layer or section. Thus, a first element, component, region, layer or section in one embodiment could be termed a second element, component, region, layer or section in another embodiment without departing from the teachings of the present disclosure.

Spatially relative terms, such as "beneath", "below", "lower", "above", "upper" and the like, may be used herein to describe one element or feature's spatial relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing certain exemplary embodiments and is not intended to limit the inventive concept. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art, and should not be interpreted in an idealized or overly formal sense unless expressly so defined herein.

The inventive concept will be herein described in detail with reference to the accompanying drawings.

Figure 2:
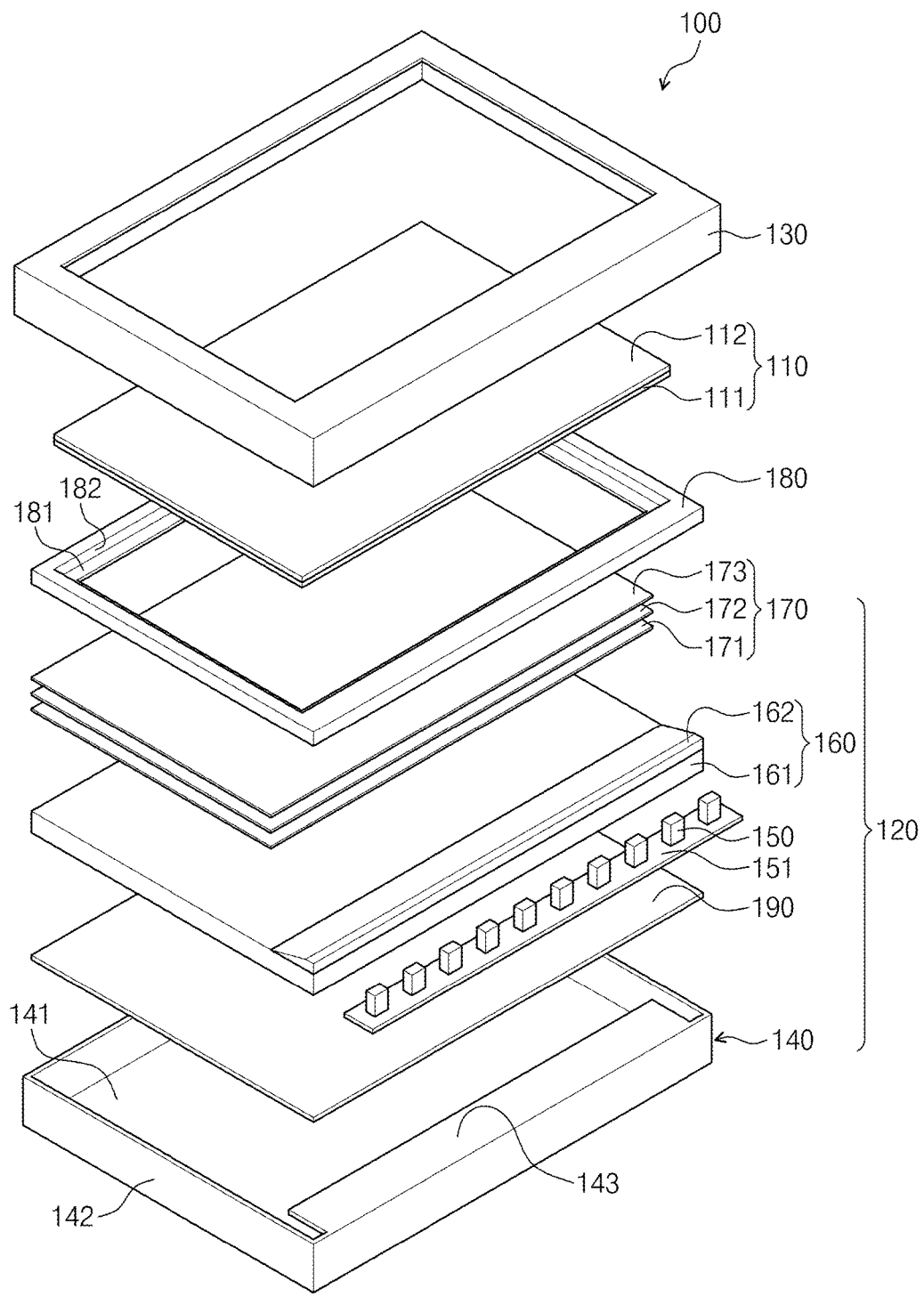
FIG. 2 is an exploded perspective view of the components of the display apparatus in FIG. 1.

FIG. 1 is a perspective view of a display apparatus 100 according to an embodiment, and FIG. 2 is an exploded perspective view of the components of the display apparatus 100.

Referring to FIGS. 1 and 2, the display apparatus 100 includes a display panel 110, a backlight unit 120, a mold frame 180, and a top chassis 130. For convenience of explanation, a direction in which an image is displayed on the display apparatus 100 is referred to as an upper direction, and a direction opposite to the upper direction is referred to as a lower direction.

The display panel 110 is configured to display an image. The display panel 110 may be a liquid crystal display panel, an electrowetting display panel, an electrophoretic display panel, or a microelectromechanical system (MEMS) display panel. In the embodiment of FIGS. 1 and 2, the display panel 110 is a liquid crystal display panel.

The display panel 110 may have a quadrangular plate shape with two pairs of sides. In the embodiment of FIGS. 1 and 2, the display panel 110 has a rectangular shape with a pair of long sides and a pair of short sides. The display panel 110 includes a display substrate 111, an opposite substrate 112 facing the display substrate 111, and a liquid crystal layer (not shown) interposed between the display substrate 111 and the opposite substrate 112. When viewed in a plan view, the display panel 110 includes a display area for displaying the image and a non-display area surrounding the display area. No image is displayed in the non-display area.

The backlight unit 120 is disposed under the display panel 110 and configured to supply a light to the display panel 110. The backlight unit 120 includes a receiving part 140, a light source 150, a light guide plate 160, optical sheets 170, and a reflection sheet 190.

The receiving part 140 includes a bottom portion 141, a sidewall 142 extending from the bottom portion 141, and a cover portion 143 extending from the sidewall 142 such that the cover portion 143 is substantially parallel to the bottom portion 141 and covers the light source 150. The sidewall 142 extends upward from the bottom portion 141.

The receiving part 140 is configured to hold the light source 150 and the light guide plate 160. Specifically, the light source 150 and the light guide plate 160 are placed on the bottom portion 141 of the receiving part 140.

The light source 150 is configured to provide light to at least one side surface of the light guide plate 160. A printed circuit board 151 may be further disposed between the bottom portion 141 and the light source 150. The light source 150 is mounted on the printed circuit board 151 and configured to receive a driving voltage from the printed circuit board 151.

The light guide plate 160 is configured to receive the light from the light source 150 and guide the light to the display panel 110. The light guide plate 160 includes a first light guide part 161 and a second light guide part 162. The first light guide part 161 includes a first material and the second light guide part 162 includes a second material different from the first material. The light guide plate 160 will be described in further detail with reference to FIGS. 3 and 5.

The optical sheets 170 are disposed between the light guide plate 160 and the display panel 110. The optical sheets 170 control a path of the light guided by the light guide plate 160. The optical sheets 170 include a diffusion sheet 171, a prism sheet 172, and a protection sheet 173.

The diffusion sheet 171 diffuses the light and the prism sheet 172 condenses the light such that a direction in which the diffused light travels is closer to a normal line direction of the display panel 110. The protection sheet 173 protects the prism sheet 172 from external impact. In the embodiment of FIG. 2, the optical sheets 170 include one diffusion sheet 171, one prism sheet 172, and one protection sheet 173. However, the inventive concept is not limited thereto. Any number of diffusion sheet 171, prism sheet 172, and protection sheet 173 of the optical sheets 170 is contemplated. For example, in some embodiments, the optical sheets 170 may include a plurality of diffusion sheets 171, prism sheets 172, and/or protection sheets 173. In some particular embodiments, one or more sheets of the optical sheets 170 may be omitted.

The reflection sheet 190 is disposed between the light guide plate 160 and the bottom portion 141. The reflection sheet 190 reflects the light that is leaked from the light guide plate 160 towards the light guide plate 160.

The mold frame 180 is disposed between the display panel 110 and the backlight unit 120. The mold frame 180 includes a supporting part 181 and a frame sidewall 182 extending from the supporting part 181. The display panel 110 is disposed on the supporting part 181 of the mold frame 180. In the embodiment of FIGS. 1 and 2, the mold frame 180 is used to support the display panel 110. In some alternative embodiments, the mold frame 180 may be omitted. In those alternative embodiments, the display panel 110 is supported by the receiving part 140, and the receiving part 140 and the display panel 110 are fixed to each other by a bonding member (not shown).

The top chassis 130 is disposed on the display panel 110 covering the non-display area of the display panel 110. The top chassis 130 is coupled to the receiving part 140 to support an edge of the display panel 110. A display window is formed through the top chassis 130 exposing the display area of the display panel 110.

Figure 3:
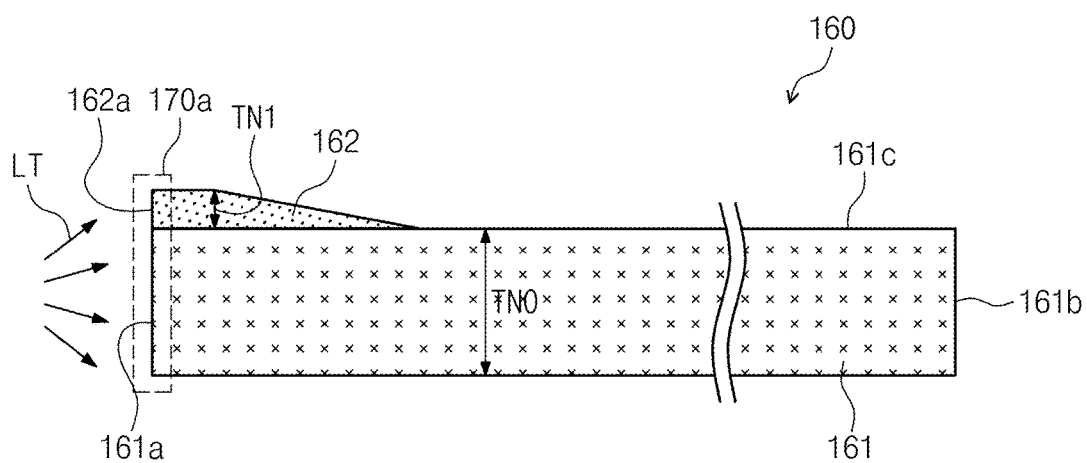
FIG. 3 is a side surface view of the light guide plate in FIG. 2.

FIG. 3 is a side surface view of the light guide plate 160 in FIG. 2.

Referring to FIG. 3, the light guide plate 160 includes the first light guide part 161 and the second light guide part 162.

The first light guide part 161 has a plate shape. The first light guide part 161 includes a first side surface 161a, a second side surface 161b facing the first side surface 161a, and an upper surface 161c connecting the first side surface 161a and the second side surface 161b.

The second light guide part 162 has a tapered shape and is coupled to the first light guide part 161. In the embodiment of FIG. 3, the second light guide part 162 is coupled to the upper surface 161c of the first light guide part 161. A thickness TN1 of the second light guide part 162 gradually decreases as a distance of the second light guide part 162 from the second side surface 161b decreases. In some embodiments, a thickness TN0 of the first light guide part 161 may range from about 0.2 mm to about 0.5 mm.

In the embodiment of FIG. 3, the second light guide part 162 may be formed using a process that is separate from a process of forming the first light guide part 161, such that the tapered light guide plate 160 can be manufactured having a thin film shape. The second light guide part 162 may be formed using, for example, an injection molding process, an imprinting process, an inkjet process, or a gravure printing process, as described later in the specification.

An incident surface 170a is defined in the light guide plate 160. Light LT is incident to the incident surface 170a. In the embodiment of FIG. 3, the incident surface 170a include a surface 162a of the second light guide part 162 and the first side surface 161a of the first light guide part 161. Since the light guide plate 160 has the tapered shape and a height of the incident surface 170a is greater than the thickness TN0 of the first light guide part 161, the amount of light leakage may be reduced when the light LT emitted from the light source 150 (refer to FIG. 2) is incident to the light guide plate 160.

Figure 4:
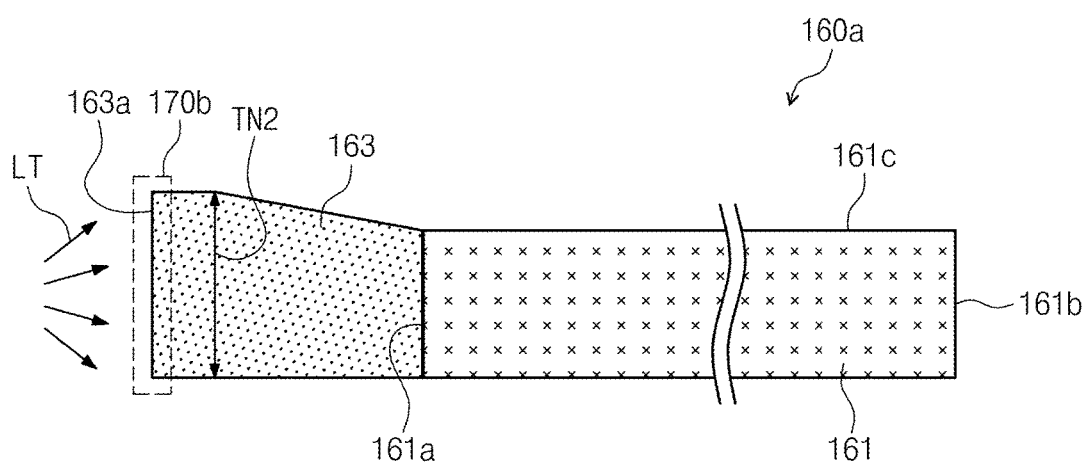
FIG. 4 is a side surface view of a light guide plate according to another embodiment.

FIG. 4 is a side surface view of a light guide plate 160a according to another embodiment. In FIGS. 3 and 4, the same reference numerals denote the same elements and thus, a detailed description of those same elements will be omitted.

Referring to FIG. 4, the light guide plate 160a includes a first light guide part 161 and a second light guide part 163.

The second light guide part 163 is coupled to a first side surface 161a of the first light guide part 161. A thickness TN2 of the second light guide part 163 decreases as a distance of the second light guide part 163 from a second side surface 161b of the first light guide part 161 decreases.

An incident surface 170b is defined in the light guide plate 160a. Light LT is incident to the incident surface 170b. In the embodiment of FIG. 4, the incident surface 170b includes a surface 163a of the second light guide part 163. Thus, the light LT emitted from the light source 150 (refer to FIG. 2) is incident to the surface 163a of the second light guide part 163 and guided to the display panel 110 (refer to FIG. 2).

Figure 5:
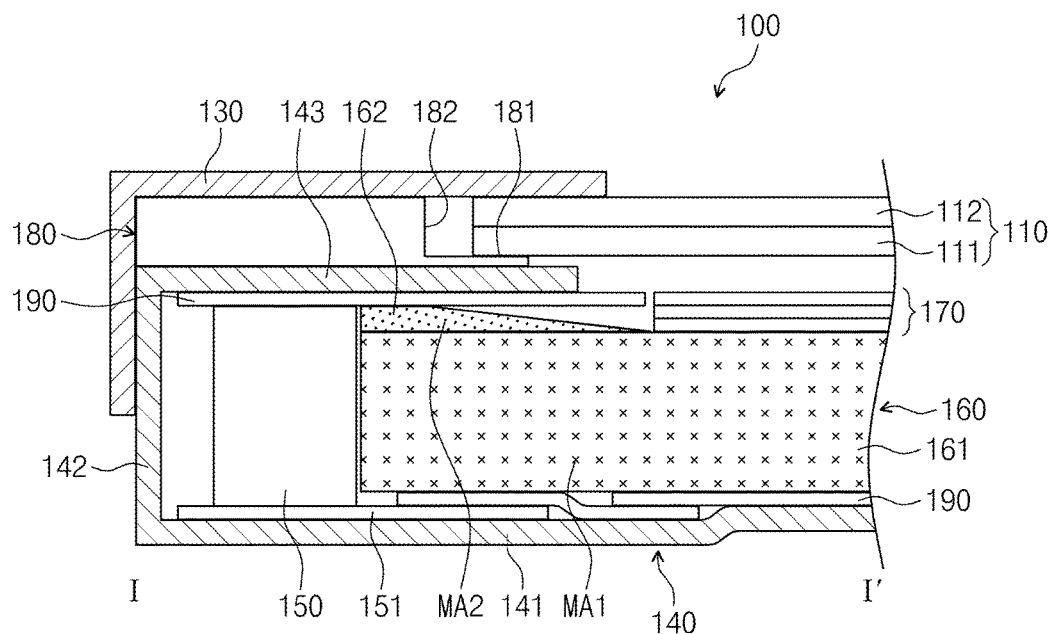
FIG. 5 is a cross-sectional view taken along line I-I' of FIG. 1.

FIG. 5 is a cross-sectional view taken along line I-I' of FIG. 1. In FIGS. 2 and 5, the same reference numerals denote the same elements and thus, a detailed description of those same elements will be omitted.

Referring to FIG. 5, the receiving part 140 includes the bottom portion 141, the sidewall 142, and the cover portion 143.

When the light guide plate 160 is disposed in the receiving part 140, the light guide plate 160 is inserted into a space between the cover portion 143 and the bottom portion 141.

In the embodiment of FIG. 5, the first light guide part 161 includes a first material MA1 and the second light guide part 162 includes a second material MA2 different from the first material MA1. The second light guide part 162 is more rigid than the first light guide part 161. In other words, a hardness of the second light guide part 162 is greater than a hardness of the first light guide part 161. In some embodiments, the first material MA1 may be, but is not limited to, a polyamide (PA)-based resin. The second material MA2 may be, but is not limited to, a polymethyl methacrylate (PPMA)-based resin or a methyl methacrylate-styrene (MS)-based resin.

In some instances, the light guide plate 160 may ground by the cover portion 143 when the light guide plate 160 is disposed in the receiving part 140. Since the second light guide part 162 having a hardness greater than that of the first light guide part 161, when the light guide plate 160 is inserted under the cover portion 143, defects (e.g., the light guide plate 160 may ground by the cover portion 143) may be reduced. Furthermore, foreign substances generated due to the light guide plate 160 ground by the cover portion 143 may be reduced. Accordingly, manufacturing yield of the display apparatus 100 can be improved using the above embodiment.

As shown in FIG. 5, the reflection sheet 190 may be further disposed between the light source 150 and the cover portion 143. The reflection sheet 190 prevents light from leaking in the non-display area of the display panel 110.

In the embodiment of FIG. 5, the display apparatus 100 includes the light guide plate 160 illustrated in FIG. 3. However, the inventive concept is not limited thereto. In other embodiments, the display apparatus 100 may include the light guide plate 160a illustrated in FIG. 4.

Figure 6:
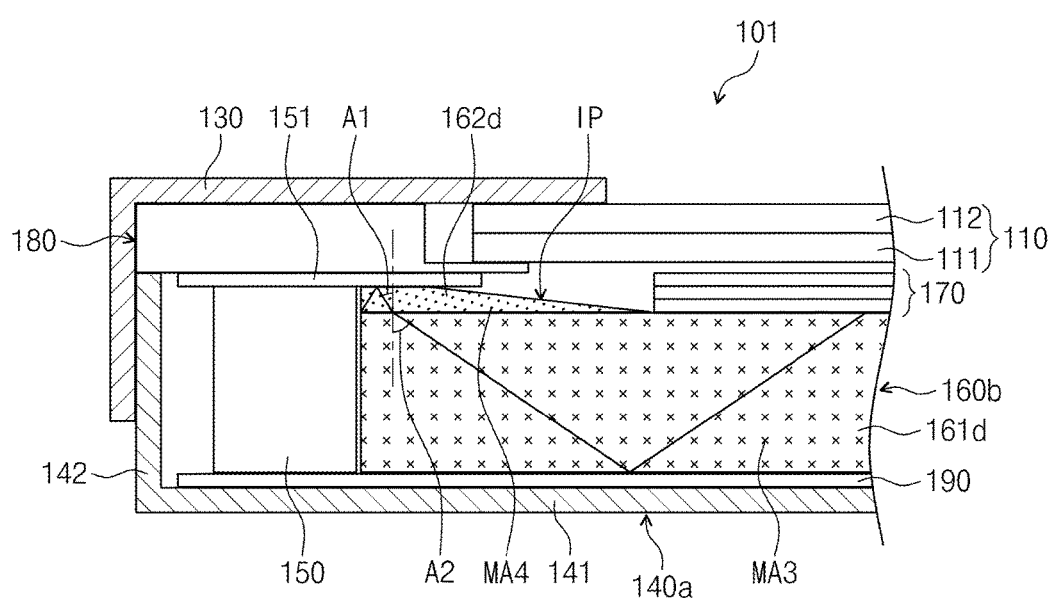
FIG. 6 is a cross-sectional view of a display apparatus according to another embodiment.

FIG. 6 is a cross-sectional view of a display apparatus 101 according to another embodiment. Specifically, FIG. 6 is a cross-sectional view of the display apparatus 101 taken along a line corresponding to the location of the line I-I' shown in FIG. 1. In FIGS. 2, 5, and 6, the same reference numerals denote the same elements and thus, a detailed description of those same elements will be omitted.

Referring to FIG. 6, a receiving part 140a of the display apparatus 101 includes a bottom portion 141 and a sidewall 142 extending from the bottom portion 141. Unlike the embodiment of FIG. 5, a cover portion 143 covering the light source 150 may be omitted from the receiving part 140a in the embodiment of FIG. 6.

In the embodiment of FIG. 6, a first light guide part 161d includes a first material MA3, and a second light guide part 162d includes a second material MA4 different from the first material MA3. A refractive index of the second material MA4 is greater than a refractive index of the first material MA3. For example, in some embodiments, the first material MA3 may include a polymethyl methacrylate (PPMA)-based resin with a refractive index of about 1.49, and the second material MA4 may include a polyamide (PA)-based resin with a refractive index of about 1.58.

Since the refractive index of the second light guide part 162d is greater than the refractive index of the first light guide part 161d, an incident angle A1 of the light travelling from the second light guide part 162d to the first light guide part 161d is smaller than a refractive angle A2 thereof, according to Snell's law.

In the embodiment of FIG. 6, since the refractive angle A2 is greater than the incident angle A1, the likelihood that light is incident to an inclined surface IP of the light guide plate 160b will be less compared to another case in which the refractive index of the first light guide part 161d is equal to that of the second light guide part 162d. Thus, light leakage to the outside of the light guide plate 160b through the inclined surface IP is reduced in the embodiment of FIG. 6. Since the light leakage is reduced and light having a uniform brightness is provided to the display panel 110, the display quality of the display apparatus 101 is therefore improved.

In addition, since the light leakage is reduced, the light utilization efficiency of the display apparatus 101 is enhanced.

Figure 7A:
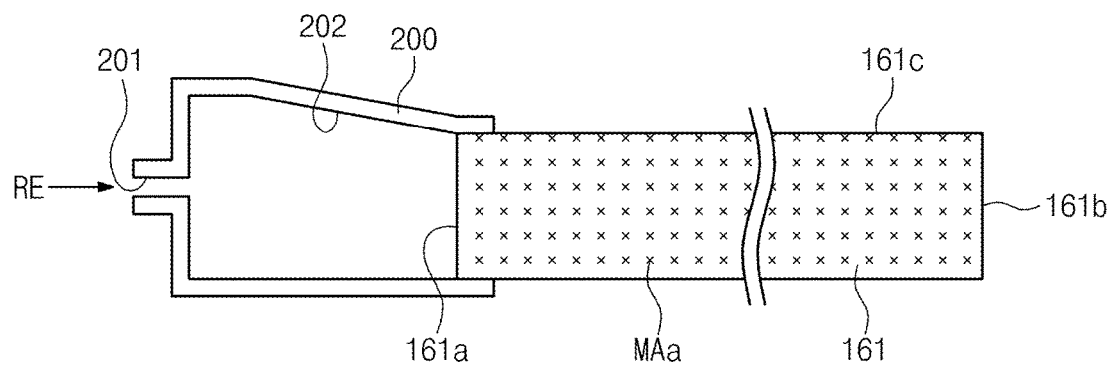
FIGS. 7A, 7B, and 7C are views illustrating a method of manufacturing the light guide plate in FIG. 4 according to an embodiment.
Figure 7B:
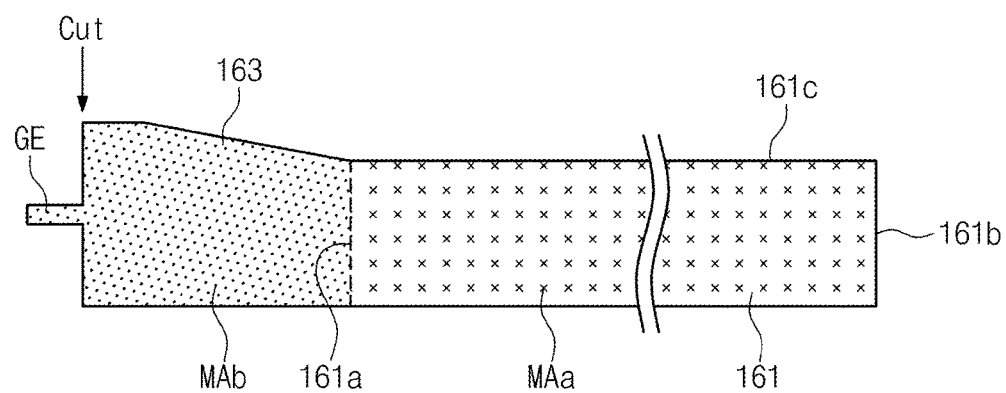
Figure 7C:
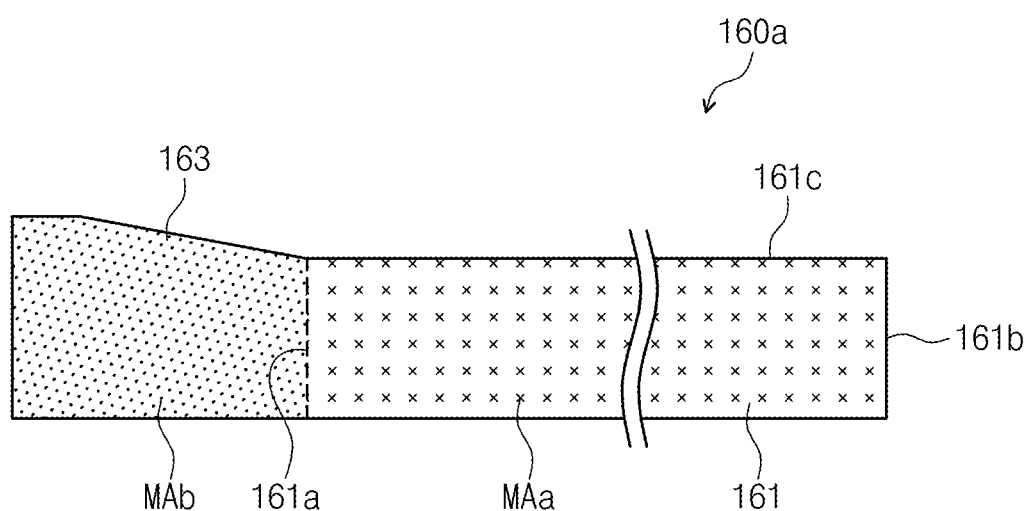

FIGS. 7A, 7B, and 7C are views illustrating a method of manufacturing the light guide plate in FIG. 4 according to an embodiment. In FIGS. 4, 7A, 7B, and 7C, the same reference numerals denote the same elements, and thus a detailed description of those same elements will be omitted.

Referring to FIG. 7A, the first light guide part 161 is formed. The first light guide part 161 is formed using an extrusion molding process. The first light guide part 161 includes the first material MAa.

A mold 200 is disposed on the first side surface 161a of the first light guide part 161. The mold 200 includes an inlet gate 201 and a frame 202. A resin RE including the second material MAb is injected into the frame 202 through the inlet gate 201, so that the resin RE is filled in the frame 202. The first material MAa and the second material MAb may have different hardnesses and/or refractive indices.

After the resin RE is filled in the frame 202, the resin RE is cured. A cold-curing process or an ultraviolet-curing process may be used to cure the resin RE.

Referring to FIG. 7B, the mold 200 is separated from the first light guide part 161. When the mold 200 is separated from the first light guide part 161, a gate GE and the second light guide part 163 are formed corresponding to the respective shapes of the inlet gate 201 and the frame 202. Subsequently, the gate GE is cut and removed.

Referring to FIG. 7C, the light guide plate 160a is formed. The light guide plate 160a includes the first light guide part 161 having the first material MAa and the second light guide part 163 having the second material MAb.

In some instances, when the first light guide part 161 and the second light guide part 163 are formed using a single injection molding process, a mold having a low thickness may be required to form a light guide plate having a thickness equal to or less than about 0.5 mm. Since a resin is provided to the mold at a high pressure and high speed, process challenges may arise in forming the light guide plate. However, in the embodiment of FIGS. 7A through 7C, the first light guide part 161 having a thin plate shape and a thickness equal to or less than about 0.5 mm is formed using the extrusion molding process, and the second light guide part 163 is formed using the injection molding process. As a result, the light guide plate 160a may be easily formed using the method of FIGS. 7A through 7C.

In the embodiment of FIGS. 7A through 7C, the method is used to form the light guide plate 160a illustrated in FIG. 4. However, it should be understood that the light guide plate 160 illustrated in FIG. 3 may also be formed using the method of FIGS. 7A through 7C.

Figure 8A:
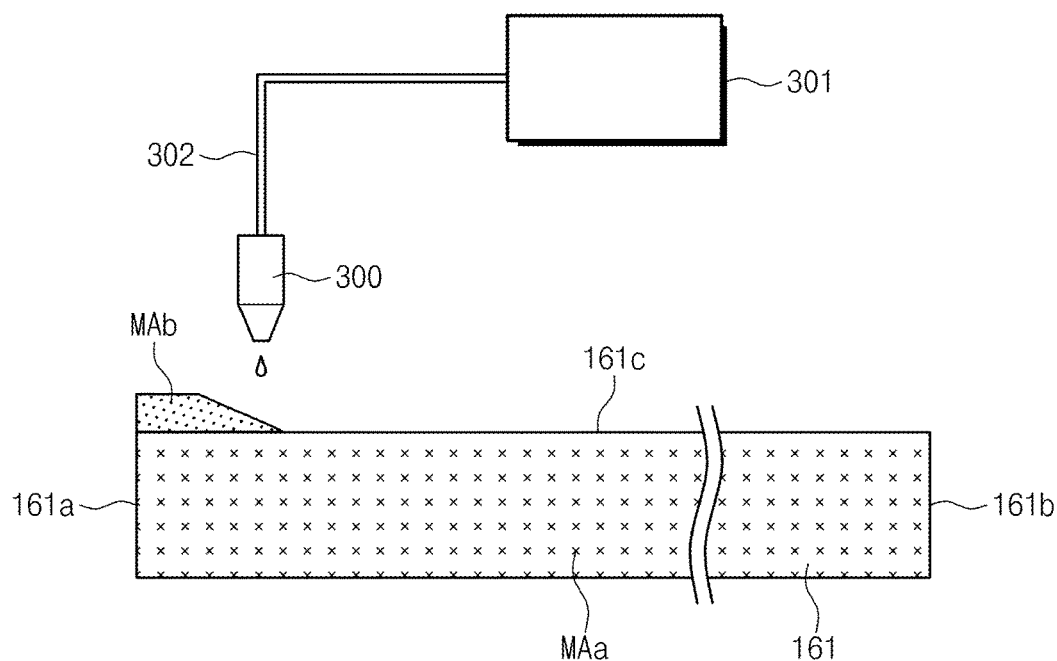
FIGS. 8A and 8B are views illustrating a method of manufacturing the light guide plate in FIG. 3 according to an embodiment.
Figure 8B:
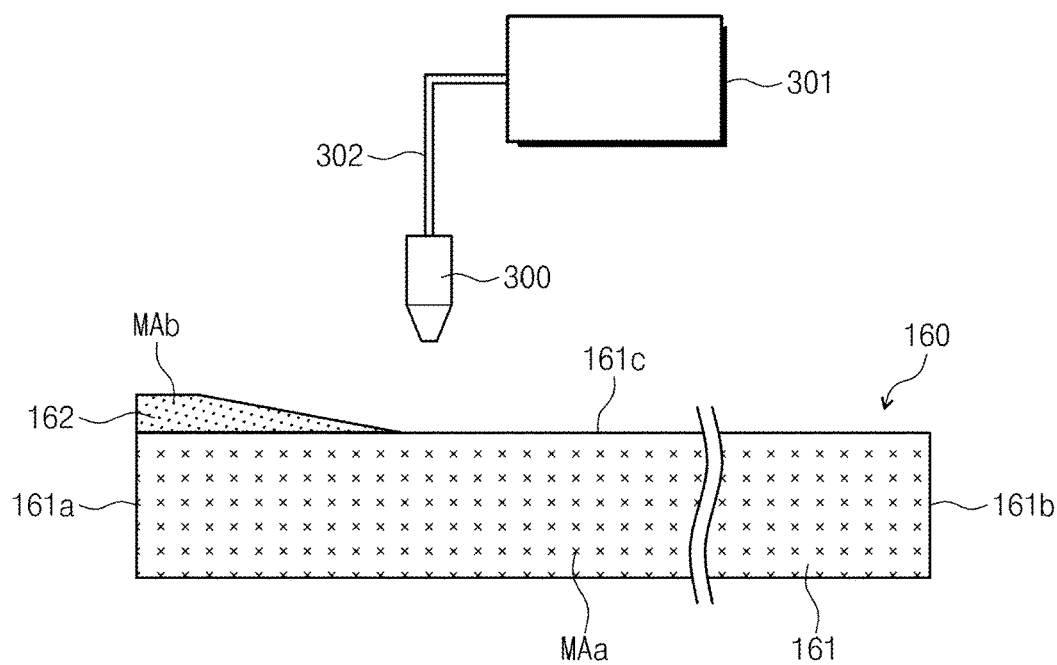

FIGS. 8A and 8B are views illustrating a method of manufacturing the light guide plate in FIG. 3 according to an embodiment.

Referring to FIGS. 8A and 8B, the second light guide part 162 may be formed using an inkjet process. An inkjet apparatus includes a storing part 301 for storing a resin, a nozzle 300 for spraying the resin, and a connection tube 302 connecting the storing part 301 and the nozzle 300, whereby the resin is conveyed from the storing part 301 to the nozzle 300 through the connection tube 302.

The first light guide part 161 is provided to the inkjet apparatus. The first light guide part 161 may be formed using an extrusion molding process. The first light guide part 161 includes a first material MAa.

The resin stored in the storing part 301 may include a second material MAb different from the first material MAa.

For example, in some embodiments, the first material MAa and the second material MAb may have different hardnesses and/or refractive indices.

The resin is provided to the upper surface 161c of the first light guide part 161 using the nozzle 300. A thickness of the second light guide part 162 decreases as a distance of the second light guide part 162 from the second side surface 161b decreases. A supply amount of the resin, a moving speed of the nozzle 300, and a moving speed of the first light guide part 161 may be controlled such that the thickness of the second light guide part 162 decreases as the distance of the second light guide part 162 from the second side surface 161b decreases.

In the embodiment of FIGS. 8A and 8B, the second light guide part 162 is formed separately from the first light guide part 161 using the inkjet process. Since the first and second light guide parts 161 and 162 are not formed by a single injection molding process, high pressure and high speed are not required to supply the resin, and thus the light guide plate 160 may be easily formed using the method of FIGS. 8A and 8B.

Figure 9A:
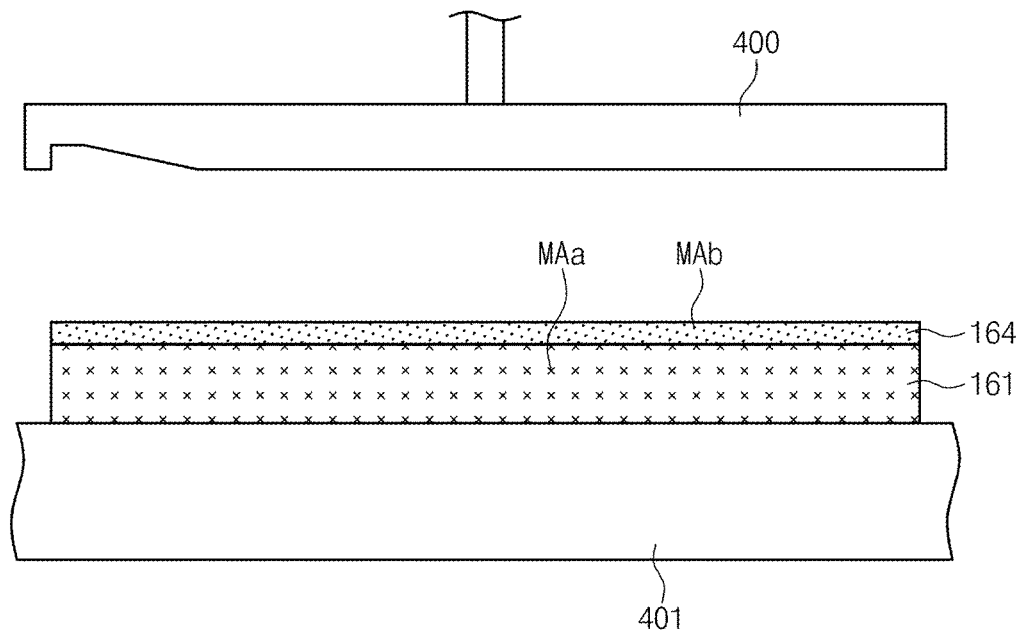
FIGS. 9A, 9B, and 9C are views illustrating a method of manufacturing the light guide plate in FIG. 3 according to another embodiment.
Figure 9B:
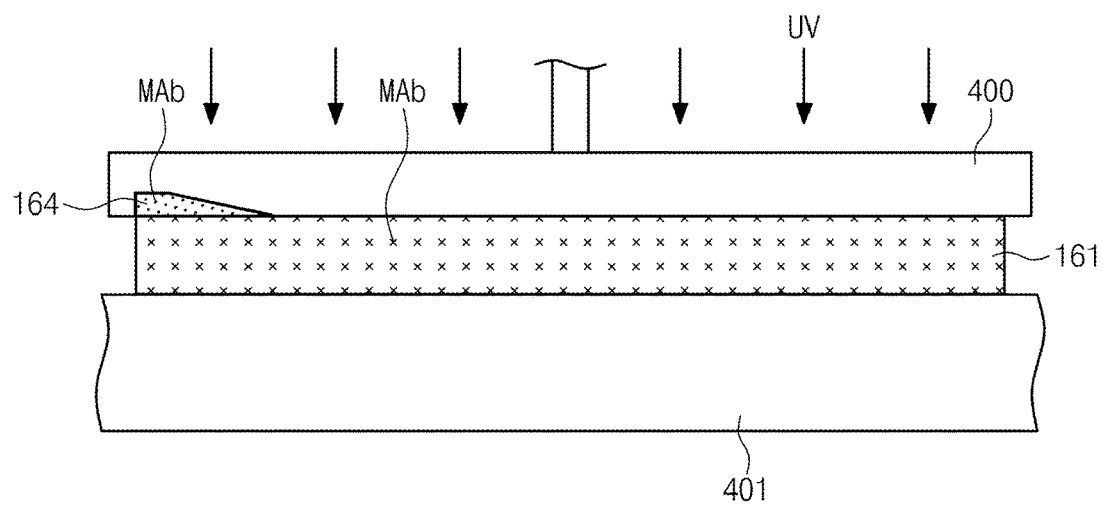
Figure 9C:
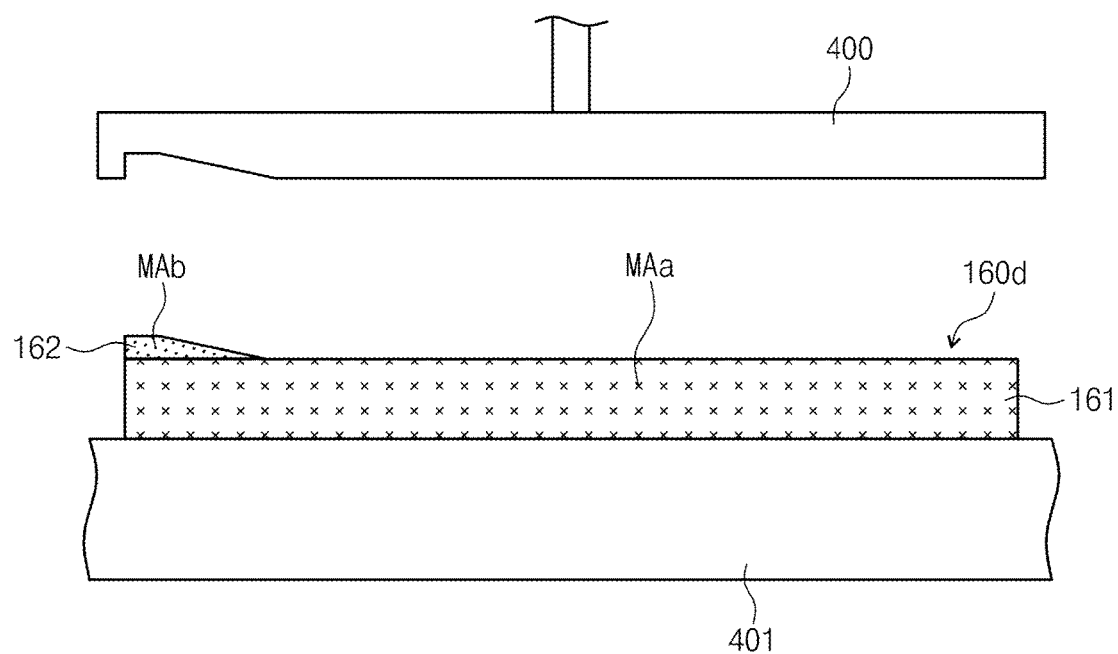

FIGS. 9A, 9B, and 9C are views illustrating a method of manufacturing the light guide plate in FIG. 3 according to another embodiment.

Referring to FIGS. 9A, 9B, and 9C, the first light guide part 161 is disposed on a supporting portion 401. The first light guide part 161 includes a first material MAa. A resist 164 is coated onto the first light guide part 161. The resist 164 includes a second material MAb different from the first material MAa. The first material MAa and the second material MAb may have different hardnessess and/or refractive indices. A stamp 400 having a tapered shape is disposed on the resist 164. The stamp 400 physically makes contact with the resist 164. An ultraviolet ray UV is then irradiated to the resist 164 and the first guide part 161. When the ultraviolet ray is irradiated to the resist 164, the resist 164 is cured having a pattern corresponding to the shape of the stamp 400. The stamp 400 is separated from the first light guide part 161, and the second light guide part 162 is formed.

According to the embodiment of FIGS. 9A through 9C, the second light guide part 162 is formed separately from the first light guide part 161 using the imprinting process. Since the first light guide part 161 and the second light guide part 162 are not formed by a single injection molding process, high pressure and high speed are not required to supply the resin, and thus the light guide plate 160 may be easily formed using the method of FIGS. 9A through 9C.

Figure 10A:
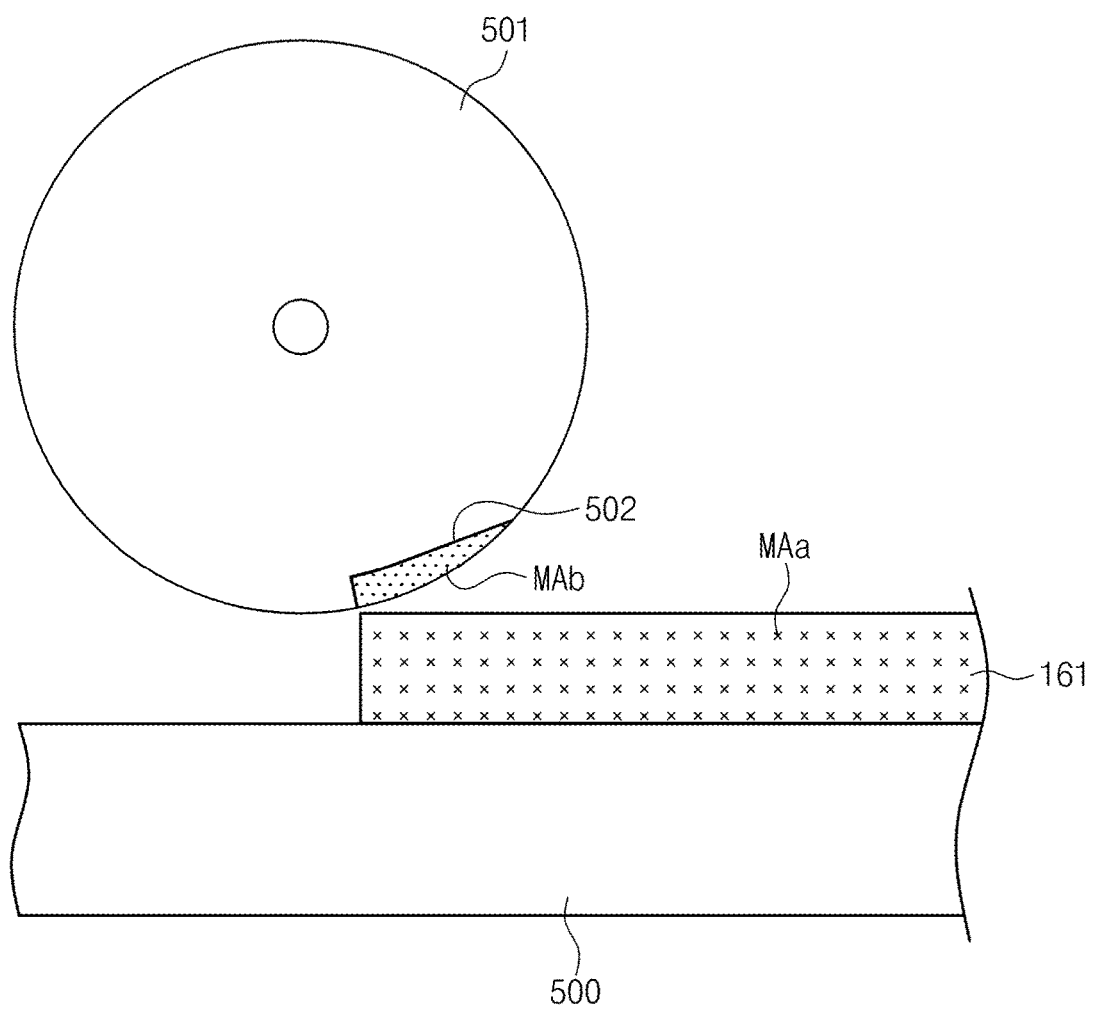
FIGS. 10A, 10B, and 10C are views illustrating a method of manufacturing the light guide plate in FIG. 3 according to a further embodiment.
Figure 10B:
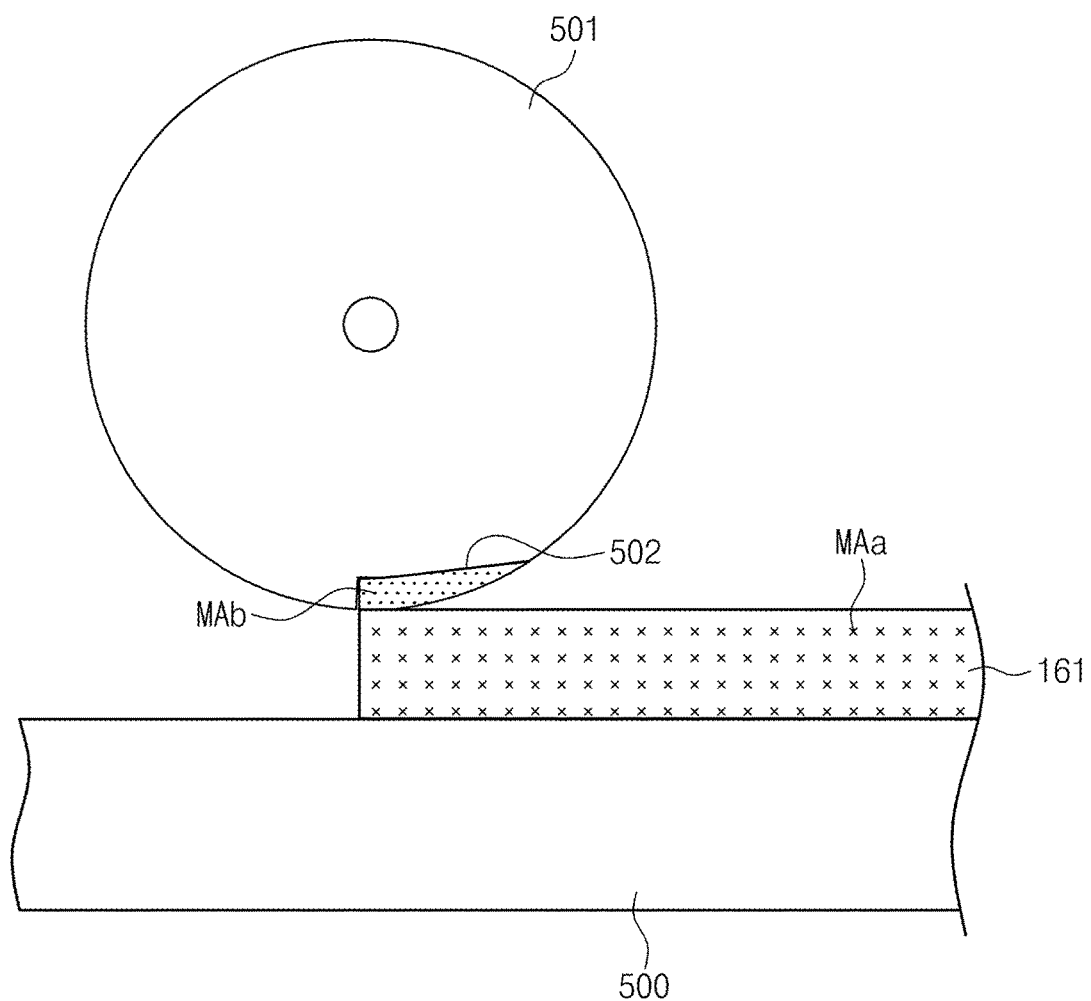
Figure 10C:
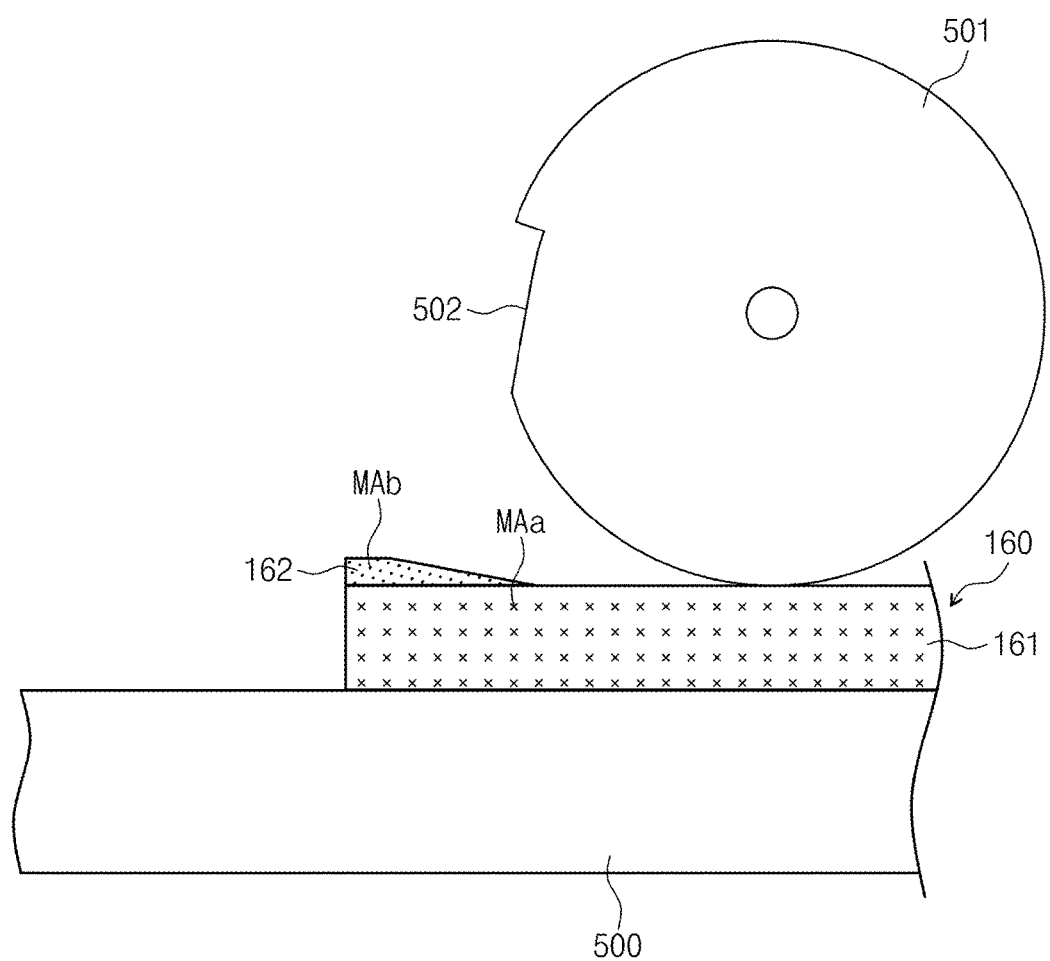

FIGS. 10A, 10B, and 10C are views illustrating a method of manufacturing the light guide plate in FIG. 3 according to a further embodiment.

Referring to FIGS. 10A, 10B, and 10C, the second light guide part 162 is formed using the gravure printing process.

The first light guide part 161 is disposed on a supporting portion 500. The first light guide part 161 includes a first material MAa. A gravure roll 501 is disposed on an upper portion of the first light guide part 161, and a recess groove 502 corresponding to the shape of the second light guide part 162 is defined in the gravure roll 501.

A resin including a second material MAb different from the first material MAa is provided in the recess groove 502, and the gravure roll 501 rotates along the first light guide part 161 to transfer the resin applied in the recess groove 502 on the first light guide part 161. As a result, the second light guide part 162 is formed by the resin transferred on the first light guide part 161.

In the embodiment of FIGS. 10A through 10C, the second light guide part 162 is formed separately from the first light guide part 161 using the gravure printing process. Since the first light guide part 161 and the second light guide part 162 are not formed by a single injection molding process, high pressure and high speed are not required to supply the resin, and thus the light guide plate 160 may be easily formed using the method of FIGS. 10A through 10C.

Although embodiments of the inventive concept have been described in the foregoing description, it should be understood that the inventive concept is not merely limited to those embodiments, and that various changes and modifications to the embodiments can be made by one of ordinary skill in the art within the spirit and scope of the present disclosure.

What is claimed is:
1. A display apparatus comprising:
a display panel configured to receive light to display an image; a light source configured to emit the light;
a light guide plate configured to receive and guide the light to the display panel; and
a receiving part configured to hold the light source and the light guide plate, wherein the light guide plate comprises:
a first light guide part comprising a first material; and
a second light guide part comprising a second material different from the first material, wherein the second light guide part has a tapered shape having an inclined surface and is coupled to the first light guide part, wherein the second light guide part is disposed above the first light guide part and facing the light source,
wherein the first light guide part is separated from the light source by the second light guide part, and
wherein a refractive index of the second material is greater than a refractive index of the first material so that the likelihood that light is incident to the inclined surface of the second light guide part is reduced, thus, light leakage to the outside of the light guide plate through the inclined surface is reduced.

2. The display apparatus of claim 1, wherein the receiving part comprises: a bottom portion on which the light guide plate is placed; and
a sidewall extending from the bottom portion.

3. The display apparatus of claim 2, wherein the receiving part further comprises a cover portion extending from the sidewall substantially parallel to the bottom portion so as to cover the light source.

4. The display apparatus of claim 3, wherein a hardness of the second material is greater than a hardness of the first material.

5. The display apparatus of claim 4, wherein the first material comprises a polyamide-based resin, and the second material comprises a polymethyl methacrylate-based resin or a methyl methacrylate-styrene-based resin.

6. The display apparatus of claim 1, wherein the first light guide part has a plate shape and further comprises:
a first side surface;
a second side surface facing the first side surface; and
an upper surface connecting the first side surface and the second side surface, and a thickness of the second light guide part decreases to form the tapered shape as a distance of the second light guide part from the second side surface decreases.

7. The display apparatus of claim 6, wherein the second light guide part is coupled to the first side surface, wherein the light is incident to an incident surface of the light guide plate, and wherein the incident surface of the light guide plate corresponds to a surface of the second light guide part.

8. The display apparatus of claim 7, wherein a thickness of the second light guide part corresponding to the incident surface of the light guide plate is greater than a thickness of the first light guide part.

9. A method of manufacturing a light guide plate, comprising:
  forming a first light guide part; and
    forming a second light guide part having a tapered shape to the first light guide part;
    wherein the first light guide part and the second light guide part are formed by separate processes the first light guide part comprises a first material, and the second light guide part comprises a second material different from the first material; the first light guide part has a plate shape and further comprises: a first side surface and a second side surface facing the first side surface, and an upper surface connecting the first side surface and the second side surface, wherein a thickness of the second light guide part decreases to form the tapered shape as a distance of the second light guide part from the second side surface decreases; wherein the second light guide part is disposed above the first light guide part and facing a light source near one of the first and second side surfaces; and wherein, a refractive index of the second material is greater than a refractive index of the first material, so that the likelihood that light is incident to an inclined surface of the second light guide part is reduced, thus, light leakage to the outside of the light guide plate through the inclined surface is reduced.

10. The method of claim 9, wherein the second light guide part is coupled to the upper surface.

11. The method of claim 10, wherein the second light guide part is formed using an imprinting process.

12. The method of claim 10, wherein the second light guide part is formed using an inkjet process.

13. The method of claim 10, wherein the second light guide part is formed using a gravure printing process.

14. The method of claim 9, wherein forming the second light guide part comprises:
  placing a mold on a surface of the first light guide part, wherein the mold comprises an inlet gate and a frame;
  injecting a resin through the inlet gate so as to fill the resin in the frame; curing the resin; and
  separating the frame from the first light guide part.

15. The method of claim 9, wherein the second light guide part is coupled to the first side surface.

* * * * *